(12) United States Patent
Cohen et al.

(10) Patent No.: US 6,697,042 B1
(45) Date of Patent: Feb. 24, 2004

(54) BACKLIGHT ASSEMBLY FOR COLLIMATED ILLUMINATION

(75) Inventors: Jennifer M. Cohen, Harrisburg, PA (US); Raymond G. Greene, Endicott, NY (US); Dean W. Skinner, Vestal, NY (US); Douglas H. Strope, Apalachin, NY (US)

(73) Assignee: Rainbow Displays, Inc., Endicott, NY (US)

( * ) Notice: Subject to any disclaimer, the term of this patent is extended or adjusted under 35 U.S.C. 154(b) by 448 days.

(21) Appl. No.: 09/721,819

(22) Filed: Nov. 27, 2000

(51) Int. Cl.[7] ................................................. G09G 3/36
(52) U.S. Cl. ........................................ 345/102; 349/62
(58) Field of Search ............................ 345/102, 87, 6; 349/5, 61, 62, 64, 65, 66, 67, 113; 362/31, 558, 561; 359/613–614

(56) References Cited

U.S. PATENT DOCUMENTS

| | | | |
|---|---|---|---|
| 2,378,252 A | | 6/1945 | Staehle et al. |
| 5,465,175 A | * | 11/1995 | Woodgate et al. ........... 359/463 |
| 5,598,281 A | | 1/1997 | Zimmerman et al. |
| 5,661,531 A | | 8/1997 | Greene et al. |
| 5,739,931 A | | 4/1998 | Zimmerman et al. |
| 5,781,344 A | | 7/1998 | Vance |
| 5,839,812 A | * | 11/1998 | Ge et al. ........................ 362/31 |
| 6,421,103 B2 | * | 7/2002 | Yamaguchi .................... 349/61 |
| 6,425,675 B2 | * | 7/2002 | Onishi et al. .................. 362/31 |

* cited by examiner

Primary Examiner—Amr Awad
(74) Attorney, Agent, or Firm—Salzman & Levy; David L. Banner

(57) ABSTRACT

A large, efficient, high power collimated backlight assembly has a highly reflective, substantially closed, thin rectangular light cavity containing highly reflective surfaces and one or more light sources. One of the large faces of the cavity is a light exit plate which contains a transmissive, light collimating structure. The cavity side of the collimating structure includes a highly reflective white planar structure containing an array of circular apertures with minimal sidewall absorption. The apertures are centered on the optical axis and located near the focal distance of a closely packed array of hemispherical or spherical lenses located on the outer surface of the collimating structure. Light rays are trapped between the highly reflective surfaces of the cavity, light sources, and aperture walls, until they enter the lenses, which output the majority of rays that enter in a collimated beam. The backlight assembly is advantageously used for transmissive type electro-optical displays, especially those whose performance is enhanced by efficient collimated light, such as seamless tiled liquid crystal displays.

33 Claims, 12 Drawing Sheets

BACKLIGHT ASSEMBLY FOR COLLIMATED ILLUMINATION

RELATED PATENT APPLICATION

The present application is related to U.S. patent application, Ser. No. 09/721,820 for CONSTRUCTION OF LARGE, ROBUST, MONOLITHIC AND MONOLITHIC-LIKE, AMLCD DISPLAYS WITH WIDE VIEW ANGLE, filed concurrently herewith, and hereby incorporated by reference.

FIELD OF THE INVENTION

This invention is directed to transmissive flat panel electro-optical displays that employ low profile, large area collimated backlights and, in particular, to displays with reflective light sources, such as large, seamless, tiled active matrix liquid crystal displays incorporating fluorescent lamps and/or LEDs in the collimated backlight.

BACKGROUND OF THE INVENTION

Transmissive flat panel electro-optical displays, such as active matrix liquid crystal displays (AMLCDs) on portable computers, require a backlight. Such flat panel displays include but are not limited to tiled FPDs, monolithic and monolithic-like FPDs. A standard configuration for such a display consists of a thin backlight mounted behind a display panel. The major optical components of the backlight are typically a white rectangular reflective cavity open on the display side, fluorescent type light bulbs that are mounted in the cavity or coupled to the cavity with an optical wave guide, and light conditioning structures such as a diffuser and/or spatially varying neutral density filters that are mounted on the open side of the cavity beneath the display. The light distribution that such backlights produce is approximately Lambertian.

Some types of transmissive flat panel displays require more collimated light than the aforementioned, standard backlight produces. Typically in these situations, additional special purpose light conditioning structures are added to the backlight on top of the diffuser to produce higher gain (i.e., less Lambertian and more collimated light distribution). This is especially true as the span or size of the display increases.

An example of a display requiring a more collimated backlight is the tiled AMLCD described in U.S. Pat. No. 5,661,531, assigned to the present assignee. In this case, the collimated light is necessary to project the image at the pixel plane to a screen disposed a short distance away, with negligible inter-pixel magnification and without intercepting the seams between the tiles. The primary motivation of the present invention is to provide a more optically efficient backlight for such a display.

A second example of applications for a collimated backlight has its motivation in overcoming the well-known fact that liquid crystal type transmissive displays typically have poor contrast with respect to viewing angle. This is because of inherent anisotropy of the liquid crystal (LC) material itself. An alternative to the quasi-Lambertian backlight, directed through an LC display panel with its inherently poor contrast at increasing non-normal view angles, is a more collimated backlight projected through the LC display panel onto a view screen directly on top of the display panel. The collimated light through the LC has a higher average contrast than does the quasi-Lambertian light. The screen redistributes this higher contrast image to viewers at various view angles.

Another example of applications for a collimated backlight is the case where the display manufacturer selects such a backlight for aesthetic, functional, and/or efficiency reasons. In such a configuration, the display is relatively brighter and has better contrast at near normal incidence from which it is normally viewed. Such applications can include displays for aircraft, military, automotive, ATM machine displays, and portable computer displays.

The design and fabrication of backlight assemblies with special light collimating structures for such displays is a uniquely challenging task. An ideal light conditioning structure for the described applications would be inexpensive to fabricate, thin, light weight, and approximately the same length and width as the backlight underneath it. Simple optical structures on one or both sides that produce a large area, uniform, substantially collimated output beam from a near Lambertian backlight source, in close proximity to the light collimating structure. The ideal backlight that uses this light conditioning structure would use efficient, inexpensive, semi-standard, white, diffuse fluorescent lamps or, alternatively, LEDs having output power scaleable both with the number of lamps, and to large sizes. The resultant backlight assembly would have output beam power very nearly equal to the backlight source beam power (high efficiency). Less ideal collimating backlights compromise the degree of collimation, optical power efficiency and fabrication cost and use more specialized lamps. The optical design of such backlight systems may be approached from the two complementary disciplines of imaging and non-imaging optics. Both have relevance to collimating backlights with their special light collimating structures.

In the field of imaging optics it is well known that a small object source placed at the focal distance from a simple thin convex lens produces a collimated beam. However, for the backlight cavity to be the object, the lens sizes and distances for such a configuration are not practicable. Other approaches are required. A lens that more efficiently captures the optical energy from a diffuse source tends to be larger than one that is less efficient. Lenses can be designed and fabricated that do an acceptable job of focusing an image from a source that is approximately the same size or slightly larger than the lens, but at the expense of optical power efficiency. Arrays of micro-lenses do not solve these problems.

In the field of non-imaging optics, the optical designer uses non-image preserving optical principles such as total internal reflection (TIR), multiple reflection and refraction, and light re-circulation between components to produce optical functions that steer and reshape source illumination, rather than strictly image an object or source. Difficult choices between optical performance, efficiency, and cost, are invariably made.

An example of a collimating backlight assembly based on non-imaging optics is the Allied signal SpectraVue™ collimation sheet, described in U.S. Pat. No. 5,739,931. The collimation sheet has thin, long lamps efficiently coupled to one or two parallel edges of a thin planar waveguide by sealed reflectors. A Fresnel lens array is laminated to the top surface of the waveguide. The waveguide is approximately the same length and width as the display to be illuminated. Light rays with appropriate angles are collimated by the Fresnel lens array; those without are totally internally reflected until they intercept the light bulbs and/or reflectors, where they reenter the waveguide for another pass. This configuration produces a very efficient area collimated backlight, but does not apply to either large or multiple diffuse sources, nor does it scale well as the area of the collimation sheet increases (i.e., the input power increases linearly with the size of one edge) but the power required increases as the square of one edge, for constant output power.

Another example of non-imaging optics, special light collimating structure for application in a collimated backlight assembly is brightness enhancement film (BEF) available from 3M Optical Systems of St. Paul, Minn. These light collimating structures are added to a conventional backlight on top of a diffuser to produce higher gain. They are transparent plastic films with a linear array of prismatic grooves in the display side surface. The display side has a specular surface and the backlight side surface is either completely specular or somewhat matte. The collimation action of these filters is based on refraction from the air-groove interface of the small percentage of incident light rays that are within certain polar and azimuth angles. About 50% of the incoming rays are redirected back towards the backlight by a combination of specular mechanisms, including double total internal reflection and multiple reflection and refraction. BEF films are thin, light weight, and relatively inexpensive to mass produce. They can be made in large sizes. However, they also strongly rely on the re-cycling properties of the backlight cavity for system efficiency. Approximately one half of their light output is outside a 30 degree cone with respect to film normal. In applications that strictly require collimated or substantially collimated light, this characteristic is simply not acceptable. The system designer using BEF films in such applications is left with two difficult choices: allow larger angle light through the display with loss of optical performance, or remove large angle light by mechanical apertures or other means, resulting in an inefficient system. The need remains for a light collimating means for such applications that is large, thin, inexpensive, highly collimating, and efficient.

Yet another example of non-imaging optics for a collimated backlight assembly is the teachings of Zimmerman et al, U.S. Pat. No. 5,598,281. This backlight uses an array of apertures to tapered optical elements that use TIR to produce a partial collimation into an array of microlenses for further collimation. These tapered optical elements have planar light input and output surfaces. The ratio of aperture surface area to overall surface area is preferably in the range of twenty to thirty percent.

SUMMARY OF THE INVENTION

It is an object of the present invention to provide a large, thin, scaleable, optically efficient, and highly collimated backlight.

The invention is based on the combination of three concepts: the first two concepts produce a novel, strongly collimating, transmissive, light conditioning structure with high back reflectance. The third concept provides for fabrication of an efficient backlight assembly with the inventive light conditioning structure.

The first concept is that a highly collimated light conditioning structure is realized from a modified basic refractive light diffuser, such as described in U.S. Pat. No. 2,378,252. The diffuser, however, is operated in reverse. That is, the entrance and exit surfaces are reversed. This idea also applies to variants of the basic refractive light diffuser, for example as taught in U.S. Pat. No. 5,781,344. The genus of these light conditioning structures is a composite of transparent beads set into an opaque, absorbing, black matrix approximately one bead radius thick. The bead matrix composite is normally on a transparent substrate. The beads either touch or nearly touch the substrate plate. These light diffusers are normally used as projection screens.

A minimally divergent beam from a projector is incident on the hemispherical bead surfaces. The beads refractively focus the projector beam through their close focal point, after which the beam diverges to large view angles. Hence, the view screen function. The black matrix serves as an exit pupil for the beads and also improves the ambient contrast of the light collimating structure screen. In the present modified reversed application, the cavity provides divergent light to the aperture that is near the close focal point of the lens element, whereupon it exits the lens as a more collimated beam. With bead refractive indices or hemispherical lens elements spanning the range of plastics and optical glass, effective bead aperture ratios for quasi-close packed beads are approximately 16%±10%.

The light collimating structure fabricated from the reversed basic refractive diffuser is an excellent collimator, but by itself it is inefficient for two reasons. First, the matrix material is explicitly highly absorbing and of low reflectivity for view screens with good ambient contrast. Much of the light is simply absorbed. The second reason is that the aperture area for light to enter the bead is approximately five percent of the total area. Thus, only a small fraction of the incident light is transmitted through the structure.

The second concept on which the present invention is based addresses the aforementioned first problem by replacing the highly absorbing and low reflectivity matrix of the above refractive light collimating structures with a highly reflective, low absorbing, white material or structure so that light that does not intercept the entrance aperture of the bead will be reflected back into the backlight cavity, rather than be absorbed or otherwise lost.

However, the material characteristics of the opaque, absorbing, black matrix of the basic refractive light collimating structure screen are different from the highly reflective, low absorbing, white matrix of the inventive light collimating structure. In practice, the beaded screen light collimating structure black matrix has the desired properties in thickness of tens of microns, and is quite transparent for thinner sections, whereas the white matrix has the desired properties only in thicknesses of approximately one third of a millimeter to a few millimeters. These material property constraints mean that the radius for the bead or for a hemisphere lens for this invention is greater than or equal to the thickness of the reflective structure on the cavity exit plate. An additional design element is that the sidewalls of the aperture are not highly absorbing. The majority of light rays that intercept the sidewalls are not absorbed, but reflected or scattered.

The third concept on which this invention is based addresses the second aforementioned inefficiency by using the inventive light collimating structure as the cavity exit plate of a substantially light-tight, low absorption, white, high reflectance cavity with included highly reflective light sources. The present invention uses an array of apertures not significantly dependent on TIR or planar input and output surfaces. The preferred aperture ratio is approximately 16%±10%. The inventive backlight assembly includes a substantially light-tight, highly reflective, low absorption cavity containing light sources that are highly reflective. A low loss cavity with included light source s is critical for an efficient, collimated, backlight assembly. Light rays generated from the sources have many opportunities to intercept an entrance pupil of a bead. Those that do are efficiently collimated; those that do not are re-circulated until they do.

A backlight consisting of such a cavity and exit plate light collimating structure is not only an excellent collimator, but also a highly efficient collimated backlight.

BRIEF DESCRIPTION OF THE DRAWINGS

A complete understanding of the present invention may be obtained by reference to the accompanying drawings, when considered in conjunction with the subsequent detailed description, in which.

For purposes of both clarity and brevity, like elements and components will bear the same designations and numbering throughout the FIGURES.

DETAILED DESCRIPTION OF THE PREFERRED EMBODIMENT

The invention is a large, efficient, high power collimated backlight assembly having a highly reflective, substantially closed, thin rectangular light cavity containing highly reflective surfaces and one or more light sources. One of the large faces of the cavity is a light exit plate which contains a transmissive, light collimating structure. The cavity side of the collimating structure includes a highly reflective white planar surface containing an array of circular apertures with minimal sidewall absorption. The apertures are centered on the optical axis and located near the focal distance of a closely packed array of hemispherical or spherical lenses located on the outer surface of the collimating structure. Light rays are trapped between the highly reflective surfaces of the cavity, light sources, and aperture walls, until they enter the lenses, which output the majority of rays that enter in a collimated beam. Certain parameters optimize the backlight efficiency and desired degree of collimation: effective reflectivity and geometry of the cavity with light sources, ratio of aperture area to lens element cross sectional area, aperture geometry and absorption, and refractive index and geometry of the lens elements. The backlight assembly is advantageously used for transmissive type electro-optical displays, especially those whose performance is enhanced by efficient collimated light, such as seamless tiled liquid crystal displays.

Figure 1A:
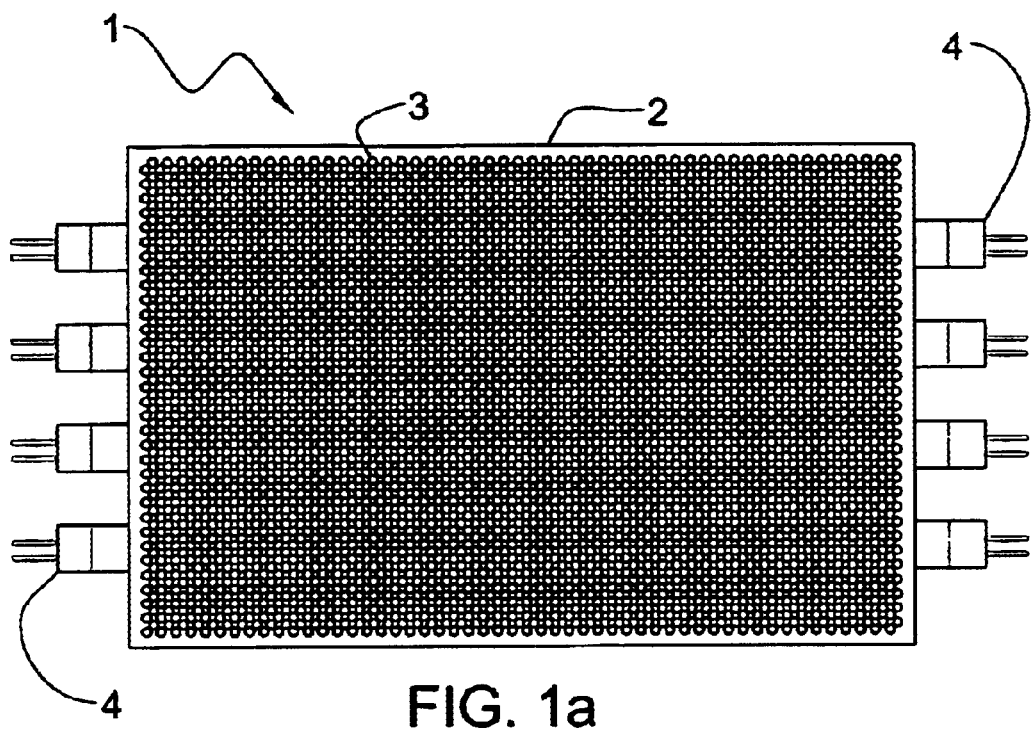
FIG. 1a is a top view of the backlight assembly of the present invention, showing a cavity exit plate light collimating structure with lens array and non-illuminated sections of the light sources.
Figure 1B:
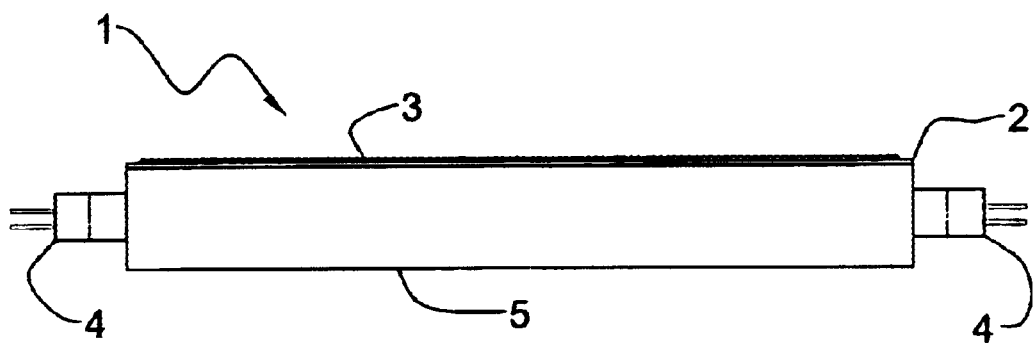
FIG. 1b is a side view of the backlight assembly of FIG. 1a, showing the cavity exit plate light collimating structure with lens array, the non-illuminated sections of the light sources, and the backlight cavity.

Referring now to FIG. 1a, there is shown a backlight assembly 1 in accordance with the invention, shown in side view in FIG. 1b. The backlight assembly 1 consists of three major sub-assemblies: a cavity exit plate light collimating structure 2 with lens array 3, light sources 4, and a backlight cavity 5 (FIG. 1b).

Figure 1C:
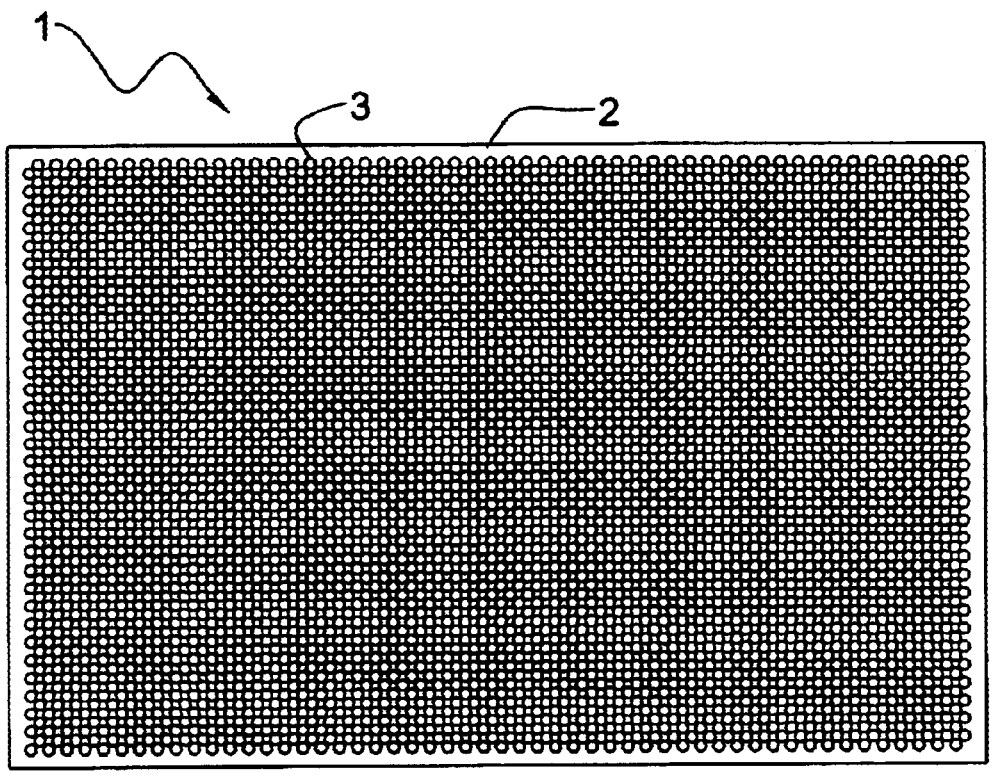
FIG. 1c is a top view of a backlight assembly with alternative light sources.
Figure 1D:
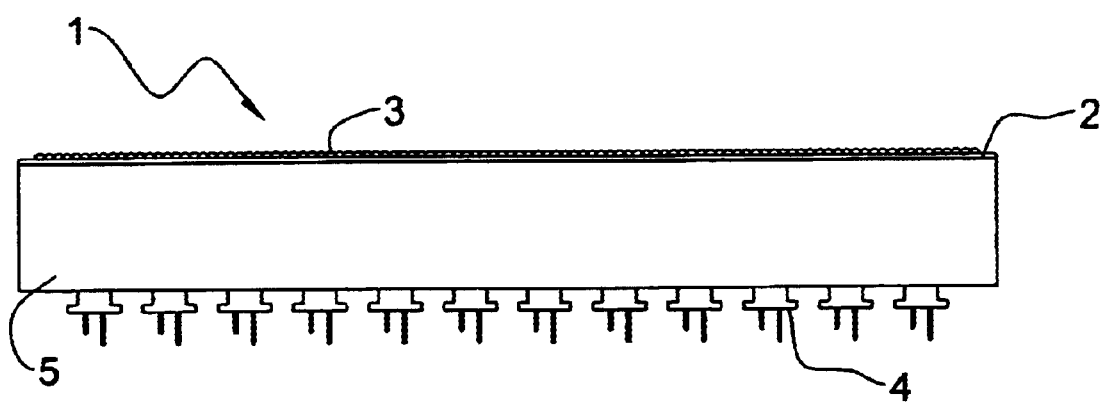
FIG. 1d is a side view of the backlight assembly of FIG. 1c, showing the cavity exit plate light collimating structure with lens array, the non-illuminated sections of the light sources, and the backlight cavity.

An alternative embodiment of backlight assembly 1 is shown in top view in FIG. 1c, and in side view in FIG. 1d. In this configuration, a multiplicity of small light sources 4 are disposed on the rear of the backlight assembly 1.

Figure 2A:
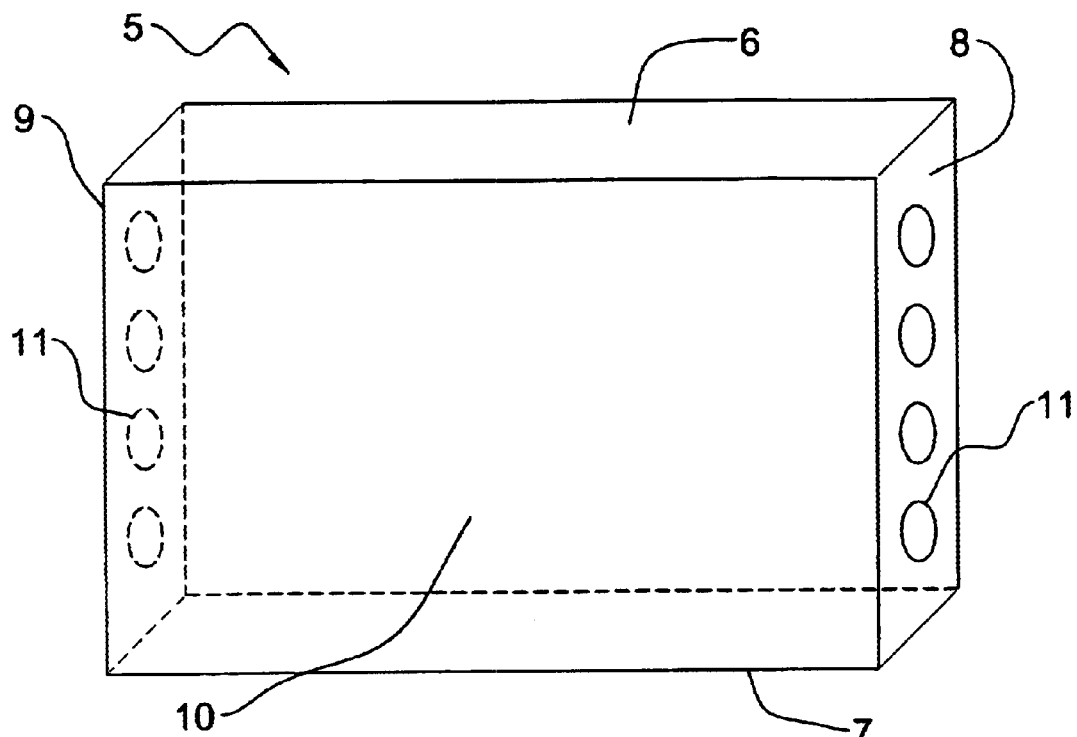
FIG. 2a is a perspective top view of the interior surfaces of the backlight cavity depicted in FIG. 1a without the exit plate light collimating structure and light sources.

Referring now to FIG. 2a, the interior cavity surfaces of the backlight cavity 5 of the preferred embodiment (FIGS. 1a and 1b) form a highly reflective, substantially light-tight cavity that has a large area. It is thin and substantially rectangular. The major optical components of the interior surfaces of the backlight cavity 5 are sides 8 and 9, top 6, bottom 7, and back 10. Also shown are apertures 11 for non-illuminated ends of the light sources 4.

Figure 2B:
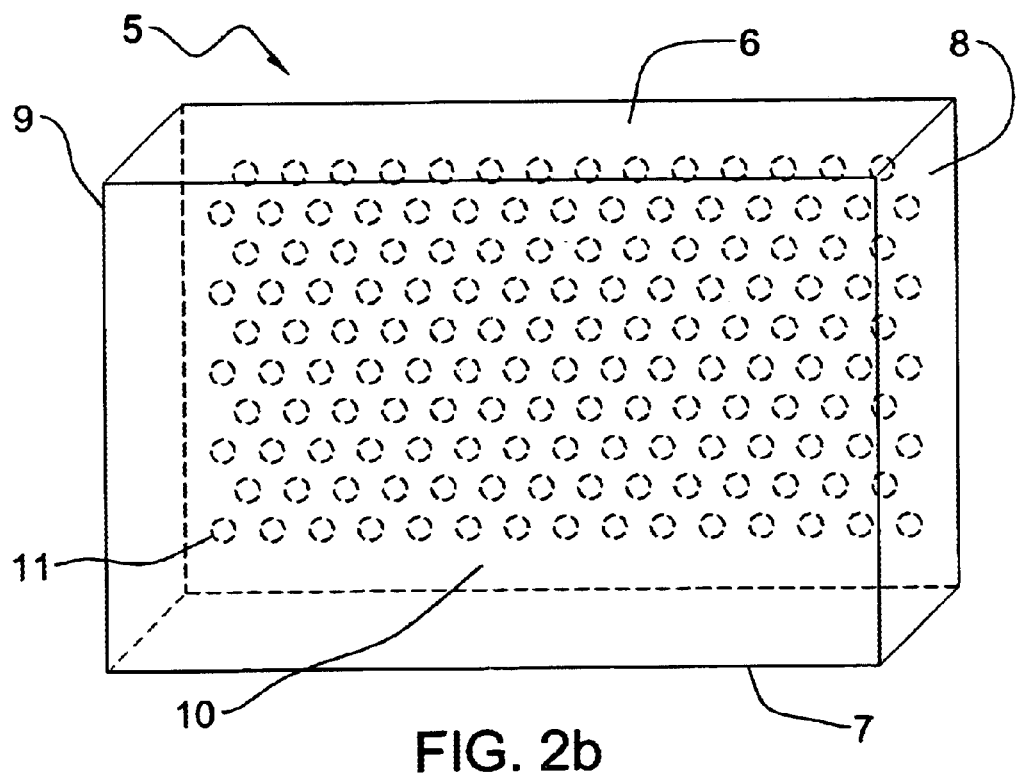
FIG. 2b is a perspective top view of the interior surfaces of the backlight cavity depicted in FIG. 1c without the exit plate light collimating structure and light sources.

Referring now to FIG. 2b, the interior cavity surfaces of the backlight cavity 5 of the alternate embodiment (FIGS. 1c and 1d) also form a highly reflective, substantially light-tight cavity that has a large area. It, too, is thin, and substantially rectangular. The major optical components of the interior surfaces of the backlight cavity 5 are sides 8 and 9, top 6, bottom 7, and back 10. Also shown are apertures 11 for mechanical mounting or electrical feed through for light sources 4.

Numerous materials can be used for the interior cavity surfaces to give effective total cavity reflectivity (i.e., diffuse plus specular) of 90%–99%. This results in essentially flat or total reflectivity across the visible spectrum of light wavelengths: white light. Common examples of such reflective material include Spectralon™ material and Teflon™ coated aluminum, multi-layer polymer films, and special phosphor mixtures coated over aluminum. Higher material reflectivity and a light-tight cavity result in a more efficient backlight.

The geometry of the cavity 5 also contributes to the backlight efficiency. Thinner backlight cavities make for more efficient backlights, all other things being equal. The shape of the cavity 5 around the light sources 4 is also important. Shapes that trap light between the lamps and non-exit surface regions of the cavity produce less efficient backlights than do shapes that funnel light away from such regions to the cavity exit surface. The shapes of the top, bottom, and sides need not be rectangular and planar as shown in FIG. 2, since slanted or curved shapes may offer efficiency advantage. In general the surface area of the cavity should be minimized. This can mean curved surfaces to blend the sides, top, bottom and back together, rather than perpendicular joints. Perpendicular joints also tend to trap light in the joints rather than guide light towards the cavity exit plate light collimating structure 2. For this reason also, the perpendicular joints may not be the most efficient.

Highly reflective, highly efficient light sources 4 include linear tube fluorescent lamps in diameters such as T5. Such light sources are shown in FIGS. 1a and 1b. The total reflectivity of such lamps is in the range of 95%–97%. The lamps 4 are mounted in the cavity 5 and protrude through the sides 8 and 9 of the cavity 5 through holes 11 with the non-illuminated end regions outside of the cavity 5 and a light-tight joint between the lamps 4 and hole 11 circumferences.

In the alternate embodiment (FIGS. 1c, 1d, and 2b) the light sources 4 would be a multiplicity of small light sources such as LEDs mounted in the cavity 5 with only mounting holes or feed through for electrical power for the light sources.

Figure 3:
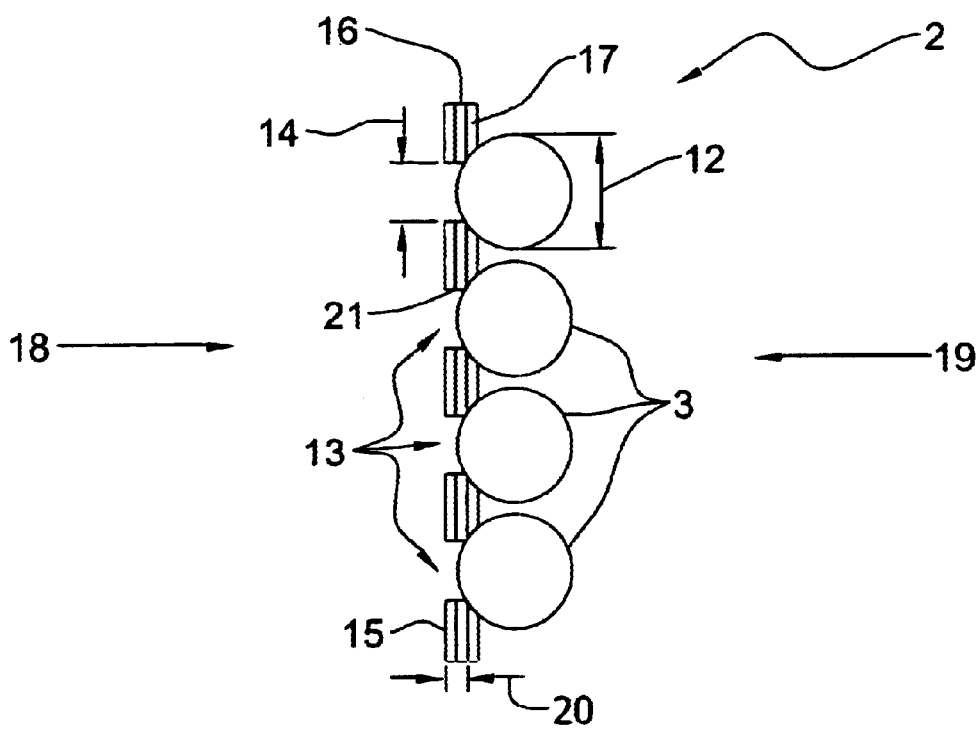
FIGS. 3, 4, 5 and 6 are respective side views of a section of various embodiments of a cavity exit plate light collimating structure.

Referring again to FIGS. 1a and 1b, the front side of the cavity 5 is the exit plate light collimating structure 2. FIG. 3 shows a side view of a section of the preferred embodiment of a cavity exit plate light collimating structure 2 with lens array 3, lens diameter 12, aperture array 13, aperture diameter 14, aperture depth 20, aperture sidewall 21, cavity exit plate 16, highly reflective cavity side structure 15, adhesive 17, optical input side 18, and optical output side 19. It is this entire structure that produces the efficient collimation of this invention.

Referring still to FIG. 3, the cavity exit plate light collimating structure 2 has four optically important functional components: highly reflective cavity side structure (e.g., Spectralon™ material and Teflon™ coated aluminum, multi-layer polymer films, and special phosphor mixtures coated over aluminum) 15, aperture array 13, lens array 3, and black, light absorbing output surface 16. The first three are essential optical elements that all preferred embodiments contain. The fourth is an enhancement that reduces large angle background light due to reflection from lens-air interface on the output side, and air-display reflection, from the order of ten percent to the order of one percent.

The lens array 3 consists of a closely packed array of substantially spherical (ball) lenses or hemispherical (plano-convex) lenses or irregularly shaped lenses to conform to the aperture function, disposed on the optical output side 19 of the cavity exit plate light collimating structure 2. The circular apertures of aperture array 13 are centered on the optical axis and near the focal distance of the lens on the optical input side 18 of the cavity exit plate light collimating structure 2. It should be understood that apertures 13 need not be circular, nor have the physical structure of a hole, as hereinbelow discussed. The lens diameter 12 is substantially larger than the minimum aperture diameter 14. The interior surfaces of the aperture array 13, between the highly reflective cavity side structure 15 and the entrance pupils of lens array 3, do not absorb a substantial percentage of the light incident on each aperture. This may be because the aperture depth 20 is small and the aperture sidewall 21 does not intercept a substantial percentage of the light incident on the aperture entrance. Alternatively, the aperture sidewall 21 is substantially non-absorbing. All preferred embodiments contain these geometrical and structural relationships between the essential optical elements.

Based on the principles outlined above for the cavity exit plate light collimating structure 2, a number of preferred embodiments can be envisioned.

In the preferred embodiment of FIG. 3, the highly reflective cavity side structure 15 is shown as reflective media on an opaque cavity exit plate 16 that provides structural support for the lens array. The lenses are held in correct position by adhesive 17. The highly reflective cavity side structure 15 of the cavity exit plate light collimating structure 2 may be of the same high reflectance material as used with the other sides of the cavity, or it may be a different, high reflectance material for thickness, fabrication cost, or other reasons. A black absorbing surface may be fabricated on the optical output side 19 between and underneath the lenses by a black coating such as paint or anodized surface on cavity exit plate 16, the cavity exit plate 16 itself being fabricated from a black absorbing material such as a black plastic, or alternatively, adhesive 17 may be black and light absorbing.

Figure 4:
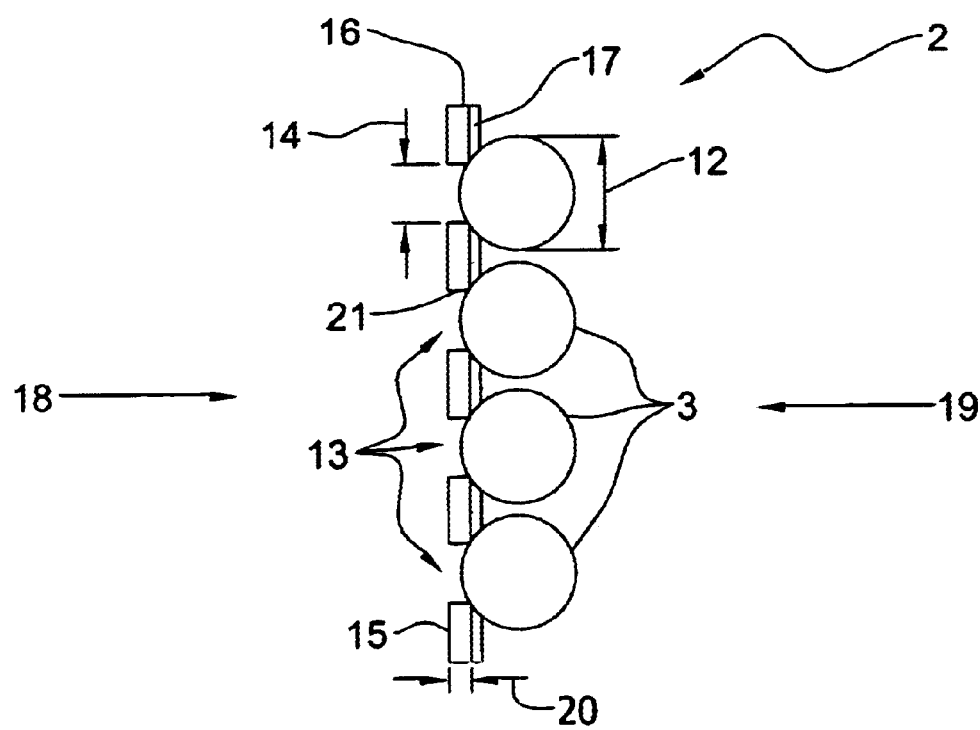

In the alternative embodiment of FIG. 4, the cavity exit plate 16 is itself made of the highly reflective material that provides the structural support for positioning the lenses: Spectralon™, for example. The aperture array 13 is directly fabricated in the plate 16, forming a cavity exit aperture plate. A black absorbing surface may be fabricated on the optical output side 19 between and underneath the lenses by a black coating such as paint on cavity exit plate 16, or alternatively, adhesive 17 may be black and light absorbing.

Figure 5:
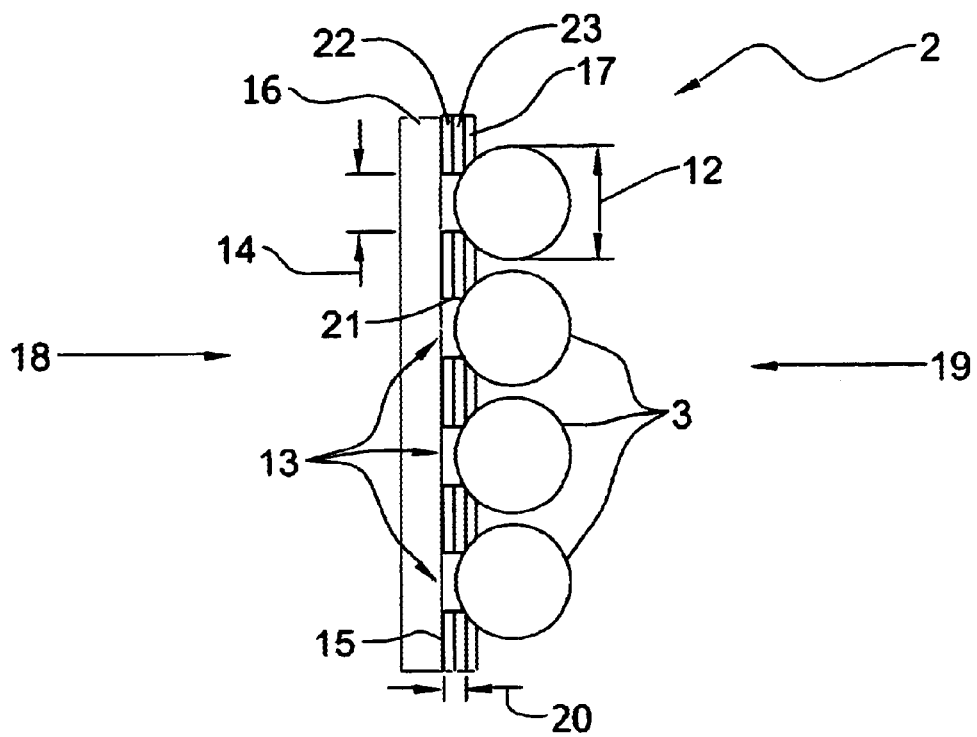

Referring now to FIG. 5, in another embodiment, the cavity exit plate 16 can be a transparent planar substrate, such as glass or plastic, without apertures on the optical input side of the cavity exit plate light collimating structure 2. The highly reflective cavity side structure is accomplished with a composite of reflective media 22 on a reflective foil 23. The apertures are in the reflective composite. A black absorbing surface may be fabricated on the optical output side 19 between and underneath the lenses by a black coating such as paint on reflective foil 23, or alternatively, adhesive 17 may be black and light absorbing.

Figure 6:
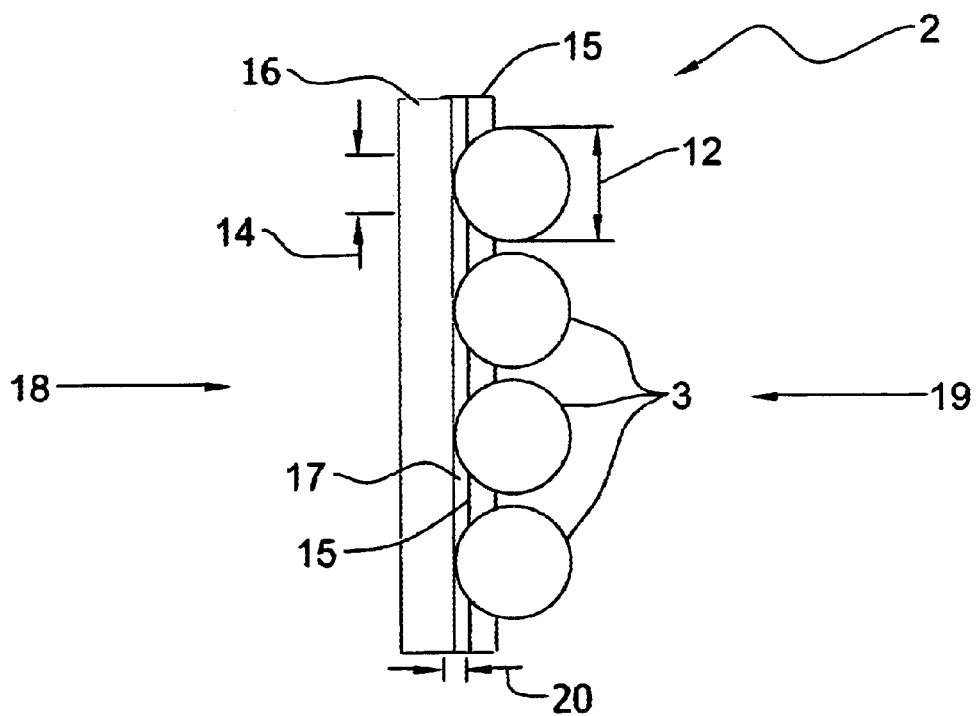

A further embodiment is shown in FIG. 6. The cavity exit plate 16 is again a transparent planar substrate, such as glass or plastic, without physical apertures formed on the optical input side of the cavity exit plate light collimating structure 2. A thin layer of optical adhesive 17 holds the lenses to the cavity exit plate 16. An annulus formed at the outermost boundary of each lens 3 provides desired light transmissive properties, identical to those shown in the aforementioned embodiments (FIGS. 3–5). The highly reflective cavity side structure 15 is accomplished with a layer of reflective media 22 on the optical output side 19 of the optical adhesive 17. The effective aperture diameter 14 has two components: the circular clear aperture in the optical adhesive to the lens, and an annulus from the average penetration depth of the light in the reflective media. A black absorbing surface may be fabricated on the optical output side 19 between and underneath the lenses by a black coating such as paint on reflective media 22.

It should be noted that, in the embodiments shown in FIGS. 3, 4 and 5, optical adhesive 17 may be present in the apertures without significantly affecting the performance of the cavity exit plate light collimating structure 2. In different structural configurations shown in FIGS. 16, 17, 18 and 19, for example, adhesive need not be used to mount and secure the lenses to the cavity exit aperture plate. A clamp plate 29

(FIG. 16) or clamp plate 29 and gasket 30 combination (FIG. 17) can be used to physically mount lens 24 to plate 16. Alternatively, clamp plate 29 can be placed at the distal periphery of lens 24 (FIG. 18) to physically restrain the lens 24 in the desired position. In another embodiment (FIG. 19) an extrusion 31 can be formed as part of the lens 24 and held in place by clamp plate 29. A black absorbing surface may be fabricated on the optical output side 19 between and underneath the lenses by suitable black coatings such as paint on cavity exit plate 16, and clamp plate 19.

The apertures of aperture array 13 may be simple straight holes, or may have a complex geometry such as: a) a tapered hole with large side at the optical input side 18, and small end forming a lens entrance pupil; b) a ball cut shape from the optical output side 19 of the cavity exit plate 16 to the bead entrance pupil; or c) an irregular, hour glass shape with narrowest diameter between the optical input side 18 and a lens entrance pupil. The apertures may be as simple as a thin exit cavity coating beneath the bead to the entrance surface of exit cavity plate compared to the thickness required for very high reflectivity, as illustrated in FIG. 6. The apertures may be simple straight holes. The optical output side 19 of the lenses of lens array 3 may have additional thin layers of optical media to modify the collimation, or may incorporate the reflective properties of cavity exit plate light collimating structure 2.

Figure 7:
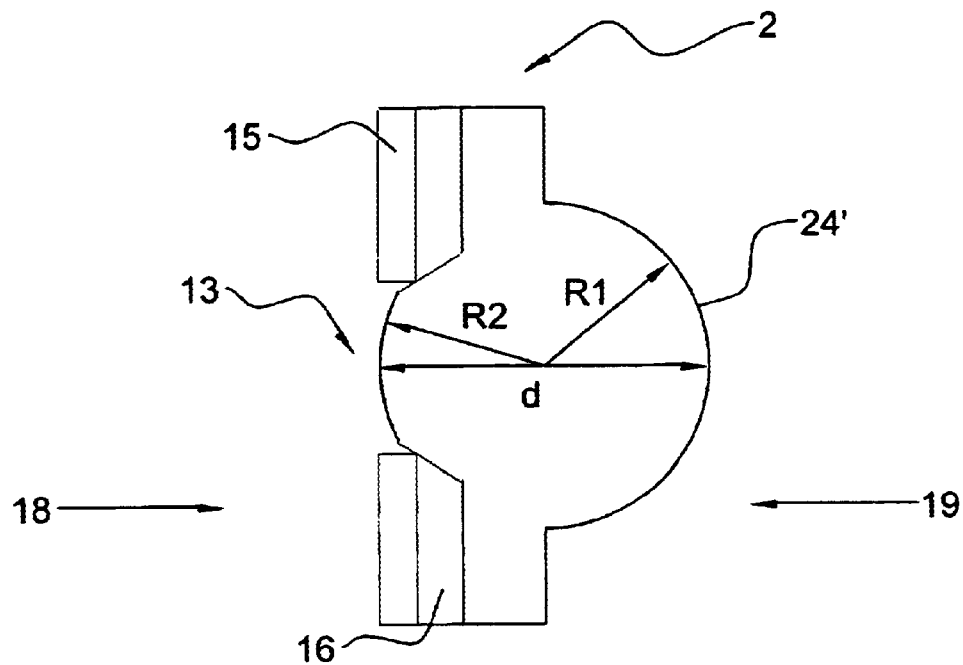
FIG. 7 is a side view of an alternate embodiment of a cavity exit plate light collimating structure having a hemisphere/convex hybrid lens array proximate the aperture array.

Referring now to FIG. 7, there is shown an alternative embodiment of the structure 2, in which is depicted a hybrid lens 24', which is one of an array of lenses (not shown), proximate an aperture 13, which is also one of an array of apertures (not shown). The overall thickness or diameter of lens 24' is depicted on the FIGURE as dimension, d. The input side of lens 24' is a convex lens having radius, R2, and disposed proximate aperture 13. The output side of lens 24' is hemispherical, with a radius, R1. A black absorbing surface may be fabricated on the optical output side 19 between and underneath the lenses by suitable black coatings such as paint on cavity exit plate 16, or non-lens surfaces of lens array 24.

Figure 8:
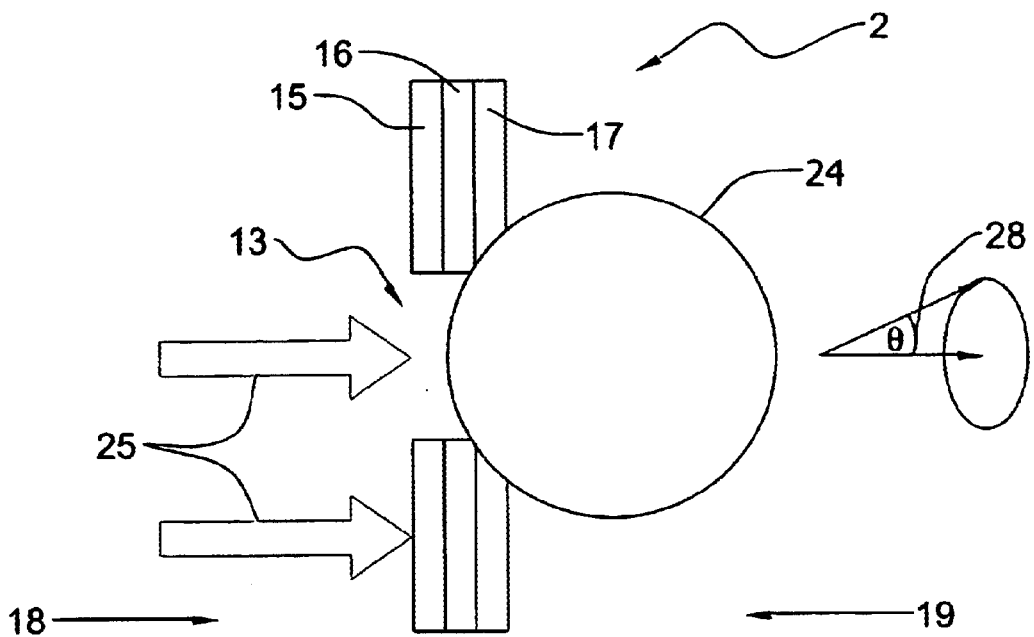
FIG. 8 is a side view of a section of a cavity exit plate light collimating structure showing light incident on two different regions of the filter.
Figure 9:
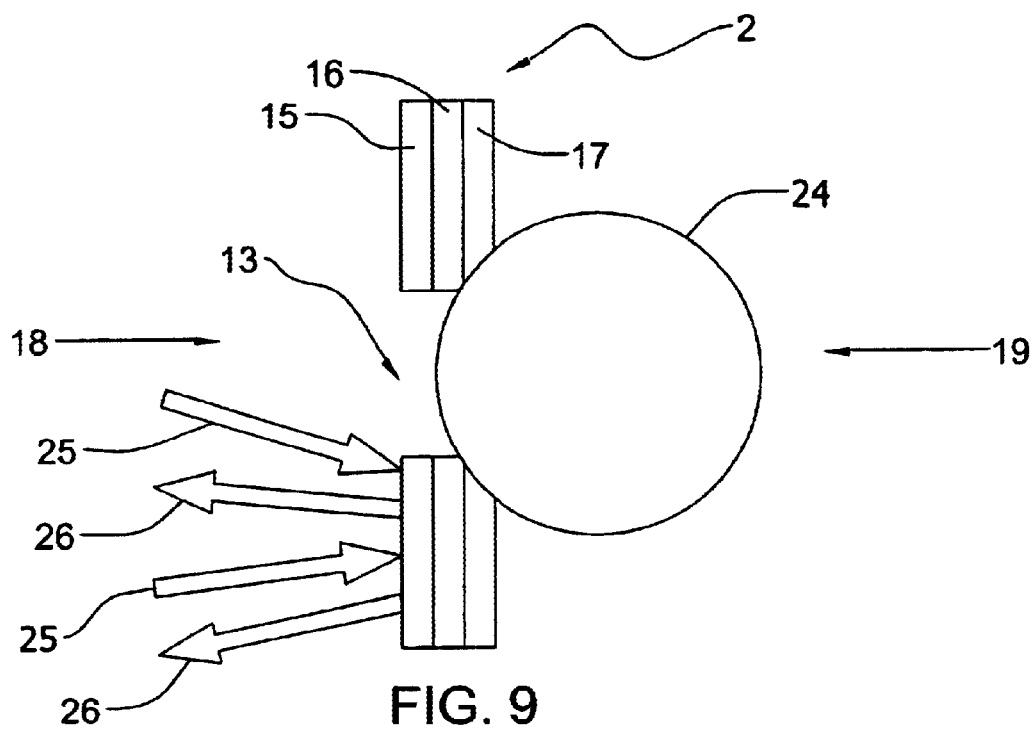
FIG. 9 is a side view of a section of a cavity exit plate light collimating structure showing light incident on and reflected from the surface of the light collimating structure.
Figure 10:
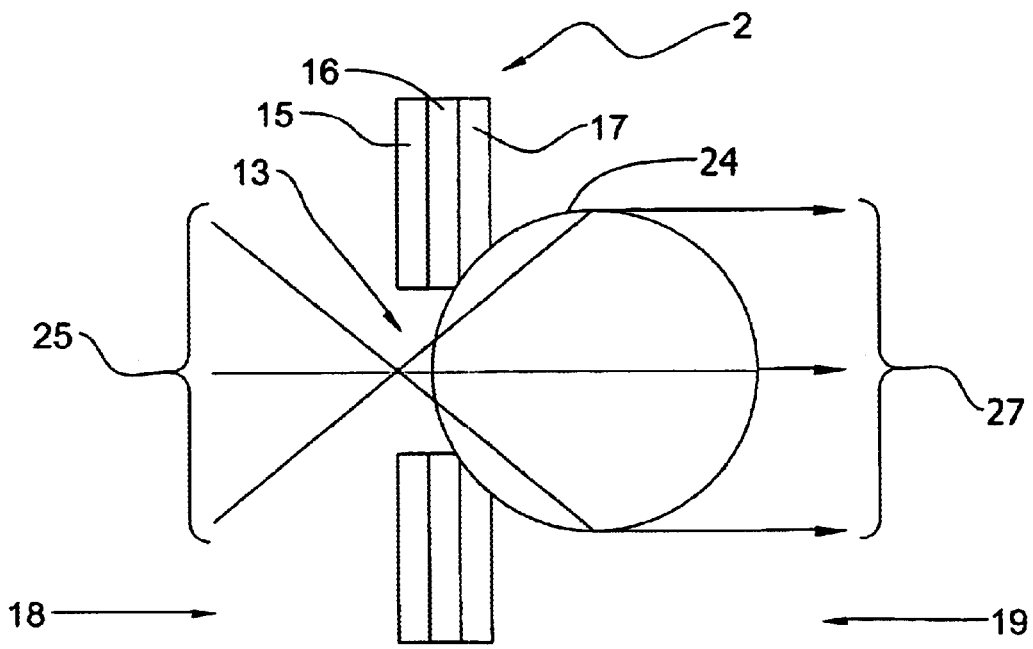
FIG. 10 is a side view of a section of a cavity exit plate light collimating structure showing light incident on an aperture and the collimation action of a lens of the light collimating structure.

FIG. 8 shows two divergent input light beams 25 incident on cavity exit plate light collimating structure 2. One beam is incident on the aperture 24, and the other is incident on the highly reflective cavity side structure 15. FIG. 9 shows the highly reflective cavity side structure 15 converting the incident divergent input beams 25 into output divergent reflected light beams 26. FIG. 10 shows a lens 24 converting the divergent input light beams 25 incident on an aperture 24 into collimated output light beams 27.

Figure 11:
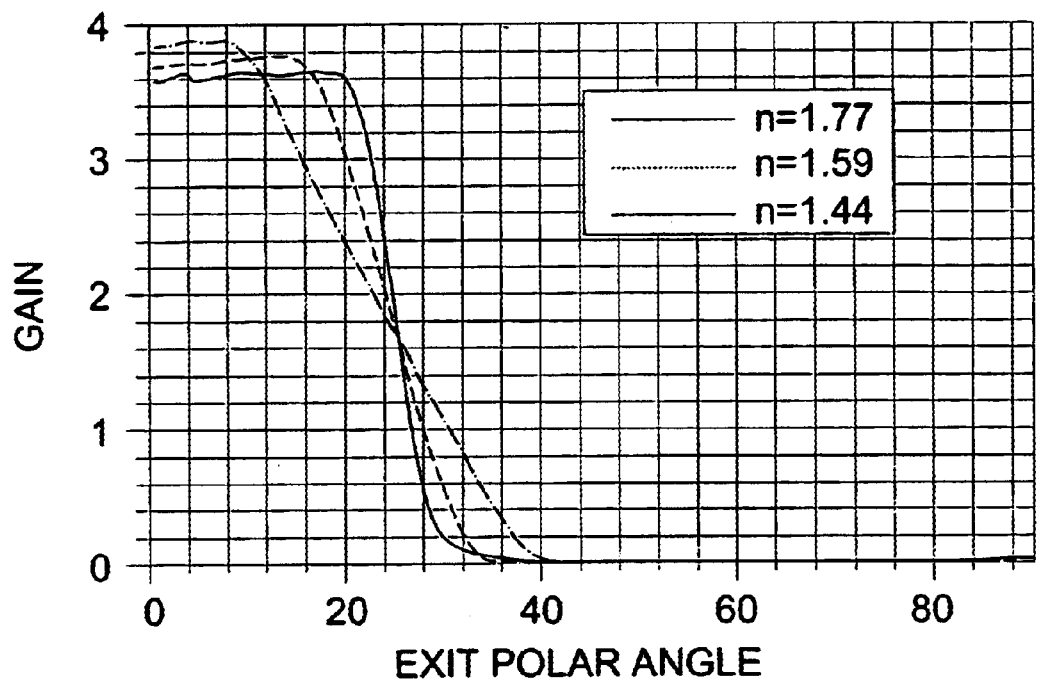
FIG. 11 is a plot of polar angle versus gain.

Depending on the aperture geometry and desired degree of collimation, various refractive indices may be preferred for the lenses. The degree of collimation is specified by the gain versus polar angle θ 28 (FIG. 8). Gain is the ratio of transmitted light to incident light on the aperture, at polar angle θ. FIG. 11 shows gain versus three possible lens refractive indices for a representative aperture geometry.

Figure 12:
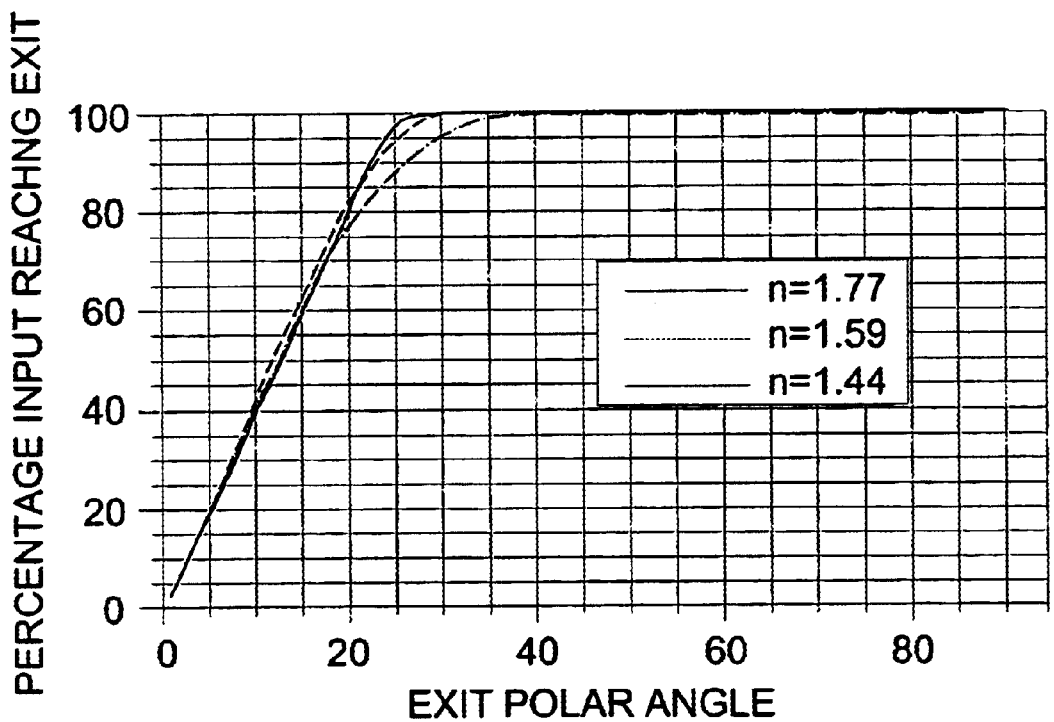
FIG. 12 is a plot of polar angle versus efficiency.

FIG. 12 shows the percent of the light incident on the aperture that is output at angles less than or equal to polar angle θ. The same lens refractive indices and aperture geometry were used for FIG. 12 as for FIG. 11.

Having described the structure and function of the backlight assembly and component sub-assemblies and their preferred embodiments, the optimization of the cavity, collimation, and backlight efficiency are described.

The efficiency of the cavity may be considered to be the fraction of the input light power delivered to the apertures. For illustrative purposes, assume that all light rays delivered to the apertures are lost to the cavity and either output by the lens or otherwise lost. Using the cavity and apertures as described above, the efficiency of the cavity is modeled as a function, f, of the aperture ratio of the cavity exit plate light collimating structure, x. Call this function f(x). The aperture ratio x is the ratio of the total cross sectional area of the apertures of aperture array 13 to the total cross sectional area of the rectangular region spanned by the entire lens array 3.

Function f(x) is the light flux into the apertures divided by the light power input into the cavity. A simple, useful model for f(x) is: $f(x)=x/((C/P)+\alpha*(1-x)+x)$, where C is a parameter that depends on the absorption and geometry of the cavity and the absorption and geometry of the light sources, P is the total area spanned by the lens array 3 of the cavity exit plate light collimating structure 2, and α is the absorption of the highly reflective cavity side structure 15.

Figure 13:
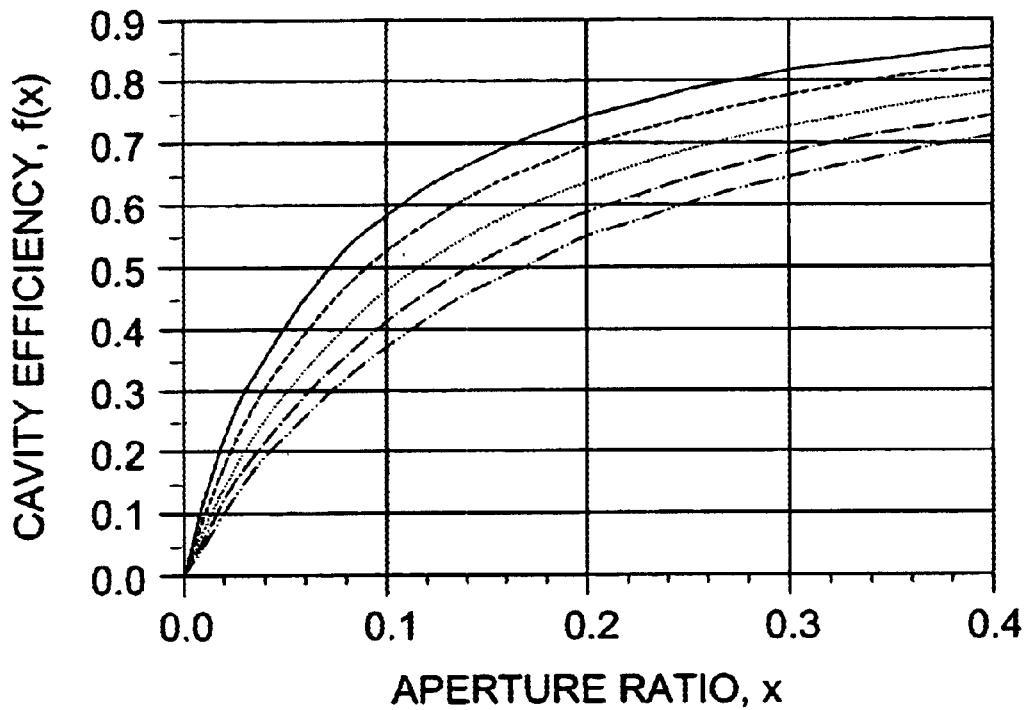
FIG. 13 is a plot of the aperture ratio versus the cavity efficiency.

Function f(x) starts at zero: f(0)=0, monotonically increasing to some asymptote. The exact functional form of f is not critical to this invention, but the cavity efficiency increasing essentially monotonically with aperture ratio is. Different families of curves are generated for various choices of the parameters encompassed by C, P, and α. An optimum cavity is the one with the highest efficiency for material, component, cost, and geometrical constraints. FIG. 13 is a plot of f(x) for various representative values of the parameters C, P, and α.

The second part of the backlight optimization process is concerned with the transfer function from the divergent bundle of rays at the aperture entrance of the cavity exit plate light collimating structure 2 to a more collimated beam on the output side of the lens elements. Let h(x) be the light output from the lens in the desired collimation cone divided by the light power into the apertures. Again, the aperture ratio is x. Function h(x) is the collimation efficiency. Design parameters include the refractive index and detailed surface properties and geometry of the structures of the aperture and all surfaces from the aperture entrance until the rays exit the final optical surface of the lens. Function h(x) is an S or sigmoid shaped curve, with h(O) near one hundred percent, monotonically decreasing to some asymptote for large x. Function h(x) may be determined and optimized for a given design by ray tracing methods well known by skilled practitioners. The exact functional form of h(x) is not critical to this invention, but the collimation efficiency decreasing monotonically with aperture ratio is. An optimum aperture/lens system is the one with the highest efficiency for material, component, cost, and geometrical constraints.

Figure 14:
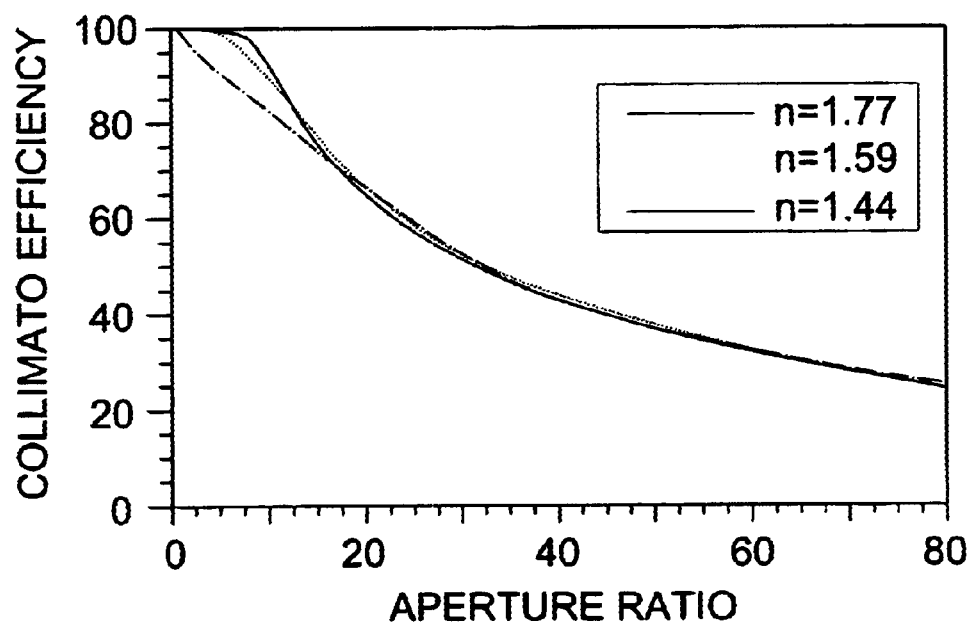
FIG. 14 is a plot of aperture ratio versus collimation efficiency.

FIG. 14 shows collimation efficiency, h(x), versus aperture ratio, x, for representative aperture geometry and three possible choices of lens refractive indices.

The third and final part of the backlight optimization process is the combination of the cavity efficiency, f(x), and collimation efficiency, h(x), into a backlight collimation efficiency, g(x). Let g(x) be the product f(x)*h(x). Function g(x) is the light output into the target collimation cone divided by the cavity input light power. Because of the monotonically increasing nature of f(x) and the monotonically decreasing nature of h(x), g(x) has a maximum for some value of the aperture ratio x. Let this value of x be x_opt and let it represent the independent optimization of both the cavity and collimation efficiency as constrained by the application requirements.

Figure 15:
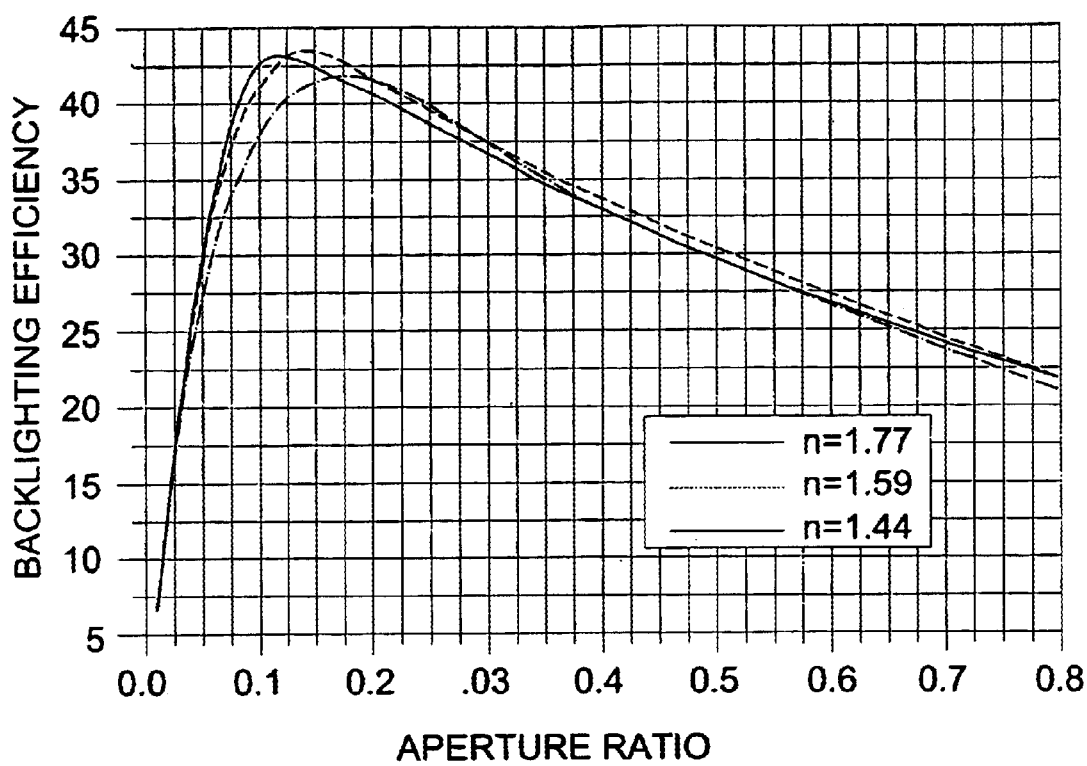
FIG. 15 is a plot of aperture ratio versus backlight efficiency.
Figure 16:
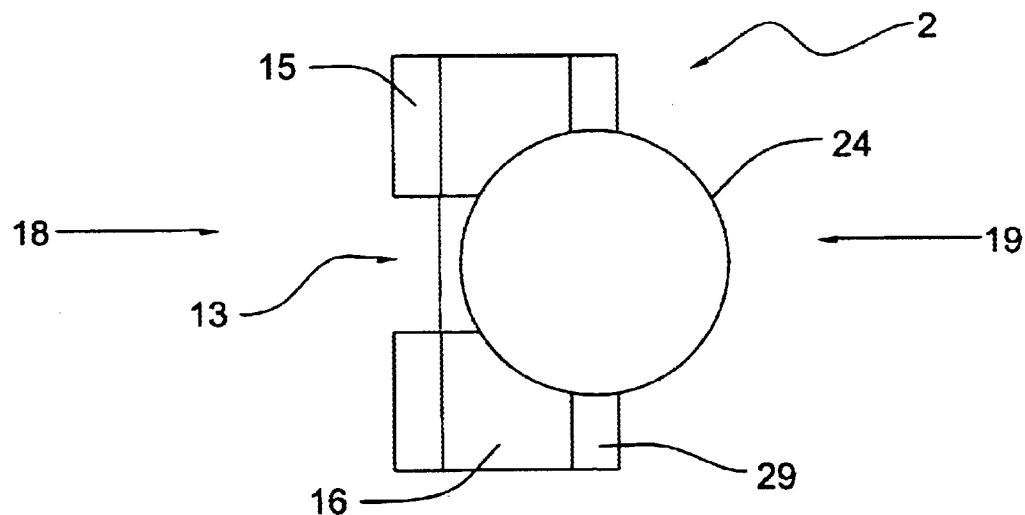
FIGS. 16, 17, 18 and 19 are respective side views of a section of various embodiments of a cavity exit plate light collimating structure with mechanical mounting means for attaching a lens to a cavity exit aperture plate.
Figure 17:
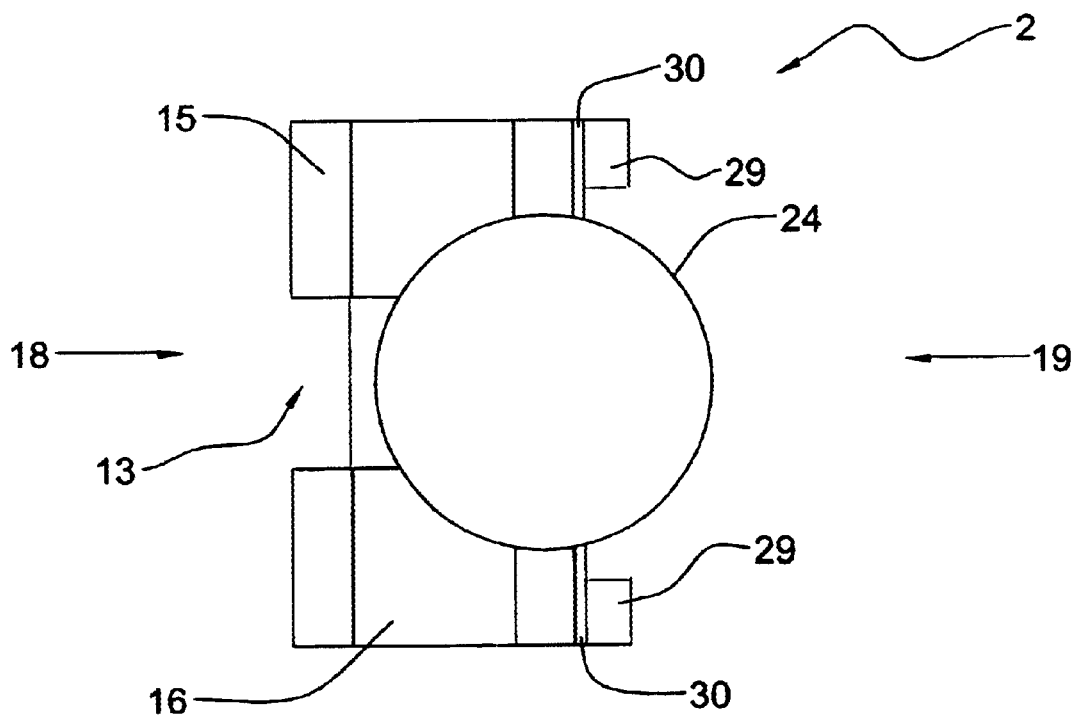
Figure 18:
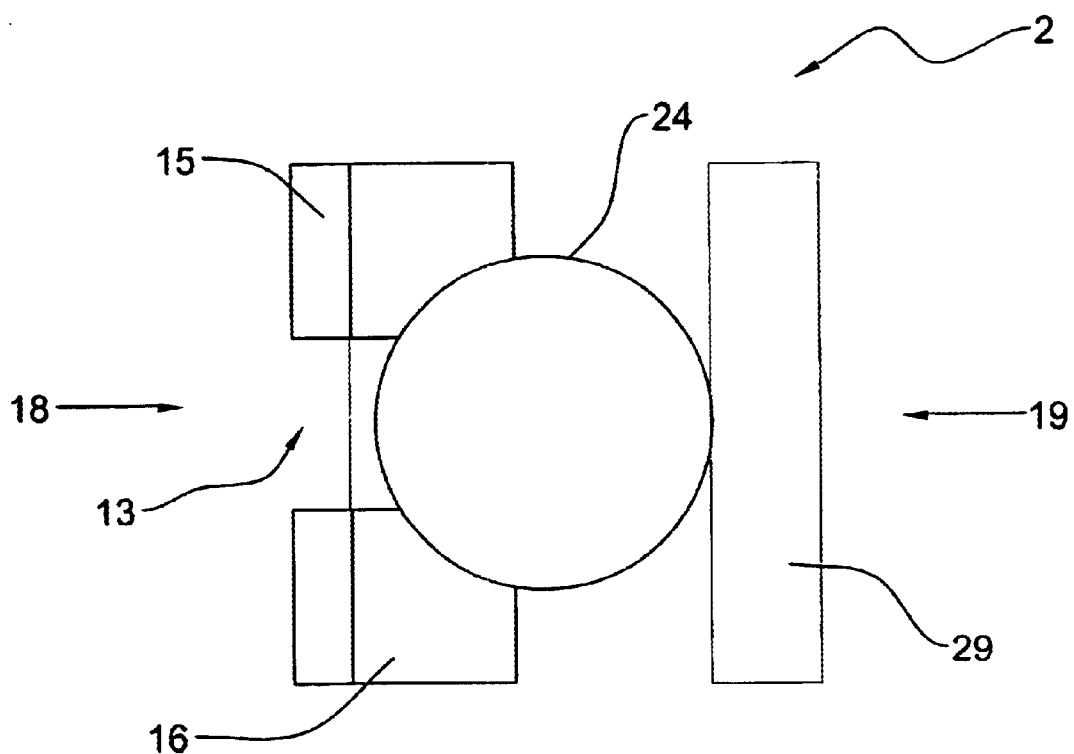
Figure 19:
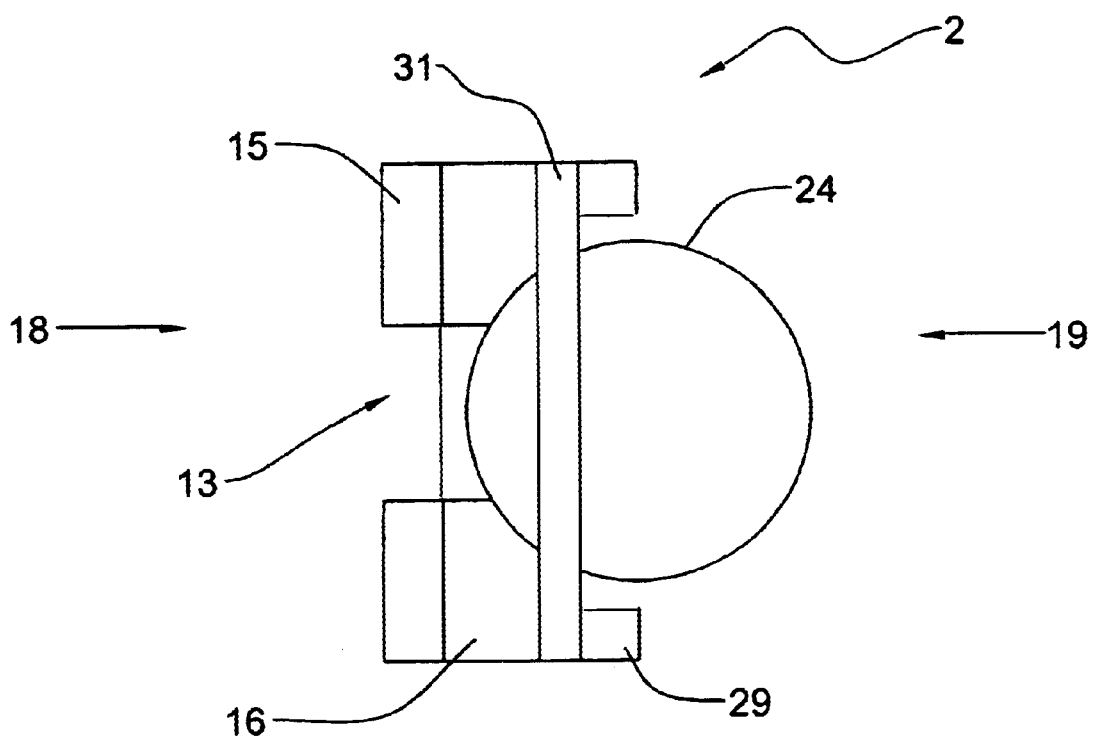

FIG. 15 shows backlight collimation efficiency, g(x), versus aperture ratio, x, for the same representative aperture geometry and lens refractive indices of FIGS. 11, 12, and 13.

The embodiments described so far have been for lens and apertures of circular cross section. Clearly the concepts, structures, and methodologies described are applicable to other geometries such as squares, rods, slits, pyramids, etc. In certain applications, such geometries may indeed be preferable and are included in this invention. As long as most or all of the incident light is transmitted through the aperture array, resulting in collimation, the geometry of the apertures and lenses is immaterial. Similarly, the invention is not meant to be limited by the specific mounting configurations, with or without adhesive, depicted and described herein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A cavity exit plate light collimating structure comprising:
   a) a single, substantially planar, composite substrate comprising a highly reflective layer and an optically absorptive layer disposed substantially parallel to one another, said composite substrate having two major, diametrically opposed exterior surfaces: said optically absorptive layer defining an optical output surface and said highly reflective layer defining an optical input surface;
   b) a plurality of spaced apart apertures disposed in said single composite substrate; and
   c) a plurality of lenses for transmitting light, each of said lenses being associated with one of said apertures and disposed proximately thereto on said optical output surface of said single composite substrate.

2. The cavity exit plate light collimating structure in accordance with claim 1, wherein said apertures comprise physical openings.

3. The cavity exit plate light collimating structure in accordance with claim 2, wherein said physical openings each comprise substantially optically non-absorbing sidewalls.

4. The cavity exit plate light collimating structure in accordance with claim 2, wherein each aperture of said plurality of apertures comprises one of the configurations: simple straight holes; a tapered hole with large side at said optical input side and small end forming a lens entrance pupil; a ball cut shape from said optical output side; and an irregular, hour glass shape with narrowest diameter between said optical input side and a lens entrance pupil.

5. The cavity exit plate light collimating structure in accordance with claim 1, wherein said apertures comprise non-perforated annuli.

6. The cavity exit plate light collimating structure in accordance with claim 1, wherein said lenses are shaped substantially spherically.

7. The cavity exit plate light collimating structure in accordance with claim 6, wherein each of said lenses has a predetermined radius and said reflective layer has a predetermined thickness, said lens radius being no less than said predetermined thickness of said reflective layer.

8. The cavity exit plate light collimating structure in accordance with claim 1, wherein each of said lenses is a hybrid lens.

9. The cavity exit plate light collimating structure in accordance with claim 8, wherein said lenses have a convex surface and a hemispherical surface.

10. The cavity exit plate light collimating structure in accordance with claim 1, wherein said lenses are shaped substantially irregularly to conform to the function of said apertures.

11. The cavity exit plate light collimating structure in accordance with claim 10, wherein each of said lenses has a predetermined radius and said reflective structure has a predetermined thickness, said lens radius being no less than said reflective structure thickness.

12. The cavity exit plate light collimating structure in accordance with claim 1, wherein said reflective layer comprises one from the group of PTFE-coated aluminum, multi-layer polymer films, and phosphor mixtures coated over aluminum.

13. The cavity exit plate light collimating structure in accordance with claim 12, wherein said reflective layer exhibits a total diffuse plus specular reflectivity in the range of approximately 90–99%.

14. The cavity exit plate light collimating structure in accordance with claim 1, further comprising an adhesive layer disposed adjacent said optical output surface and said plurality of lenses.

15. The cavity exit plate light collimating structure in accordance with claim 14, wherein said adhesive layer is optically absorptive.

16. In a flat panel display having a display panel and a backlight cavity associated therewith, the improvement comprising an exit plate collimating structure disposed in said backlight cavity, said exit plate collimating structure comprising:
   a) a single, substantially planar, composite substrate comprising a highly reflective layer and an optically absorptive layer disposed substantially parallel to one another, said composite substrate having two major, diametrically opposed exterior surfaces: said optically absorptive layer defining an optical output surface and said highly reflective layer defining an optical input surface;
   b) a plurality of spaced apart apertures disposed in said single composite substrate; and
   c) a plurality of lenses for transmitting light, each of said lenses being associated with one of said apertures and disposed proximately thereto on said optical output surface of said single composite substrate.

17. The flat panel display in accordance with claim 16, said structure further comprising:
   d) a light source disposed in said backlight cavity for providing light to said optical input surface of said exit plate collimating structure and to said display panel.

18. The flat panel display in accordance with claim 16, wherein said flat panel display comprises a monolithic or a monolithic-like display.

19. The flat panel display in accordance with claim 17, wherein said light source comprises at least one of the light sources: at least one fluorescent lamp, and light emitting devices.

20. The cavity exit plate light collimating structure in accordance with claim 17, wherein said apertures comprise physical openings.

21. The cavity exit plate light collimating structure in accordance with claim 17, wherein said apertures comprise non-perforated annuli.

22. The cavity exit plate light collimating structure in accordance with claim 17, wherein said lenses are shaped substantially spherically.

23. The cavity exit plate light collimating structure in accordance with claim 22, wherein each of said lenses has a predetermined radius and said reflective structure has a predetermined thickness, said lens radius being no less than said reflective structure thickness.

24. The cavity exit plate light collimating structure in accordance with claim 17, wherein each of said lenses is a hybrid lens.

25. The cavity exit plate light collimating structure in accordance with claim 24, wherein said lenses have a convex surface and a hemispherical surface.

26. The cavity exit plate light collimating structure in accordance with claim 17, wherein said lenses are shaped substantially irregularly to conform to the function of said apertures.

27. The cavity exit plate light collimating structure in accordance with claim 26, wherein each of said lenses has a predetermined radius and said reflective structure has a predetermined thickness, said lens radius being no less than said reflective structure thickness.

28. The cavity exit plate light collimating structure in accordance with claim 17, wherein said reflective structure comprises one from the group of PTFE-coated aluminum, multi-layer polymer films, and phosphor mixtures coated over aluminum.

29. The flat panel display in accordance with claim 17, further comprising:

e) a black, light absorbing surface disposed beneath said plurality of lenses on said optical output side of said substrate.

30. A cavity exit plate light collimating structure comprising:

a) a single, solid, optically transparent substantially planar substrate having a first surface defining an optical input surface and a second surface substantially planar to said first surface defining an optical output surface;

b) a reflective composite layer having a plurality of spaced apart apertures therein adhered to and substantially covering said optical output surface, said reflective composite layer having an outward facing surface;

c) adhesive applied to said outward facing surface; and d) a plurality of lenses adhered to said outward facing surface of said reflective composite layer, each of said plurality of lenses being substantially centered on a respective one of said plurality of apertures.

31. The cavity exit plate light collimating structure as recited in claim 30, further comprising:

e) a layer of reflective tape applied to said outward facing surface of said reflective composite layer.

32. The cavity exit plate light collimating structure as recited in claim 30, wherein said optical input surface of said single, solid, optically transparent substantially planar substrate comprises an absorptive coating.

33. The cavity exit plate light collimating structure as recited in claim 30, wherein said adhesive layer is substantially absorptive.

* * * * *